United States Patent [19]

Muntz et al.

[11] Patent Number: 5,367,878
[45] Date of Patent: * Nov. 29, 1994

[54] TRANSIENT ENERGY RELEASE MICRODEVICES AND METHODS

[75] Inventors: Eric P. Muntz, Pasadena; Richard N. Nottenburg, Santa Monica; Geoffrey R. Shiflett, Los Angeles, all of Calif.

[73] Assignee: University of Southern California, Los Angeles, Calif.

[ * ] Notice: The portion of the term of this patent subsequent to Feb. 16, 2010 has been disclaimed.

[21] Appl. No.: 989,054

[22] Filed: Dec. 10, 1992

Related U.S. Application Data

[63] Continuation-in-part of Ser. No. 790,595, Nov. 8, 1991, Pat. No. 5,186,001.

[51] Int. Cl.$^5$ ............................................. F01B 29/00
[52] U.S. Cl. ................................. 60/512; 60/516; 60/519; 60/523; 200/83 N; 219/513; 359/230; 417/207; 417/209
[58] Field of Search ................. 60/516, 508, 513, 519, 60/523, 512; 200/83 R, 83 N, 83 P; 219/513, 511; 359/224, 230; 417/207, 209

[56] References Cited

U.S. PATENT DOCUMENTS

| | | |
|---|---|---|
| 3,524,031 | 8/1970 | Mack ........................... 200/83 N |
| 4,821,997 | 4/1989 | Zdeblick . |
| 4,824,073 | 4/1989 | Zdeblick . |
| 4,943,032 | 7/1990 | Zdeblick . |
| 4,965,415 | 10/1990 | Young et al. ................ 200/83 N |
| 4,966,646 | 10/1990 | Zdeblick . |
| 5,164,558 | 11/1992 | Huff et al. ................... 200/83 R |
| 5,177,579 | 1/1993 | Jerman ....................... 200/83 N |
| 5,186,001 | 2/1993 | Muntz et al. ................. 60/515 |

OTHER PUBLICATIONS

Design and Fabrication of Micromechanical Logic Elements, by Bergstrom et al in IEEE Proceedings, 1990, CH2832-4/90/40-0015.
On a Nonvolatile Memory Cell Based on Micro-Electro-Mechanics, by B. Halg, in IEEE Proceedings, 1990, CH2832-4/90/40-0172.
On a Micro-Electro-Mechanical Nonvolatile Memory Cell, by B. Halg, in IEEE Transactions on Electron Devices, vol. 37, No. 10, Oct. 1990, pp. 2230-2236.
Deformable mirror device spatial light modulators and their applicability to optical neural networks, by Collins et al. in Applied Optics, vol. 28, No. 22, 15 Nov. 1989, pp. 4900-4907.

*Primary Examiner*—Richard R. Cole
*Assistant Examiner*—L. Heyman
*Attorney, Agent, or Firm*—Harris, Wallen, MacDermott & Tinsley

[57] ABSTRACT

A microdevice in the form of an electrical switch. A microdevice for providing switching at a high repetition rate, including a cell divided into two chambers by a bistable movable membrane. A charge of gas in the cell and a source for directly heating the gas to increase the gas pressure and move the membrane, the source for heating including a pulsed source for generating transient gas pressure increases, with the cell including an arrangement for cooling the gas for reducing the gas pressure after an increase.

20 Claims, 8 Drawing Sheets

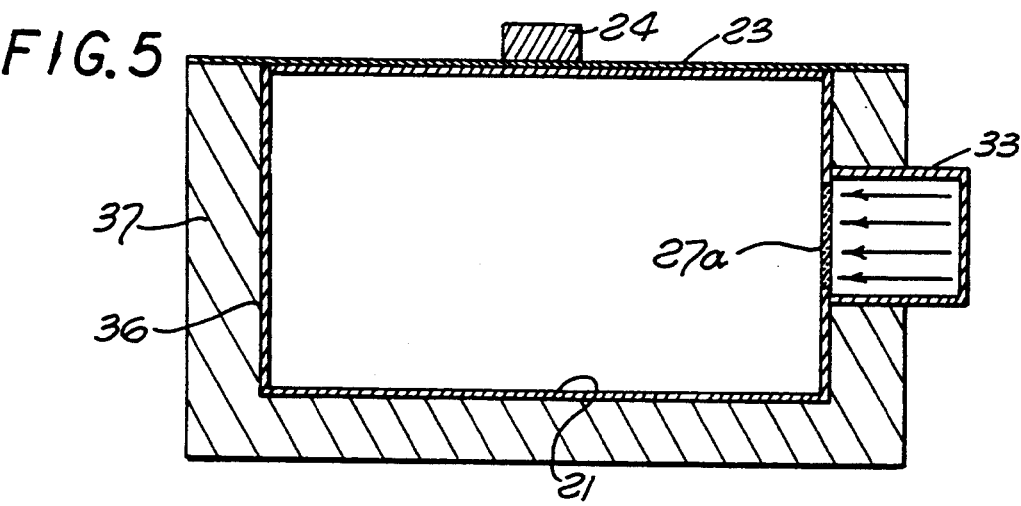
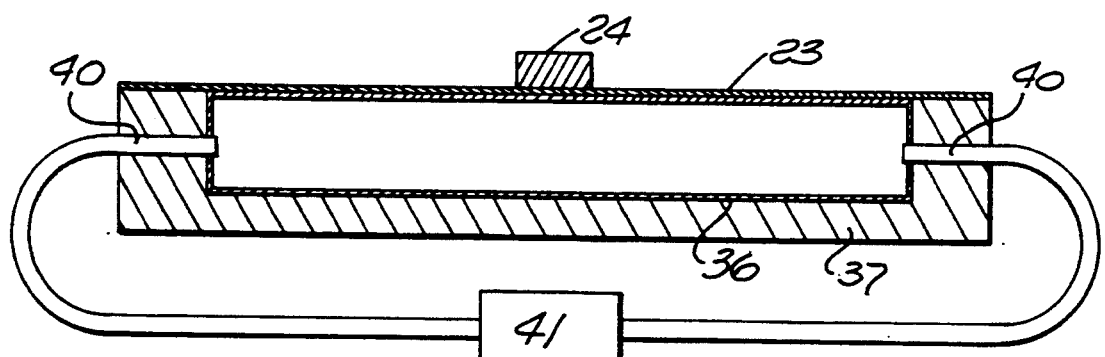
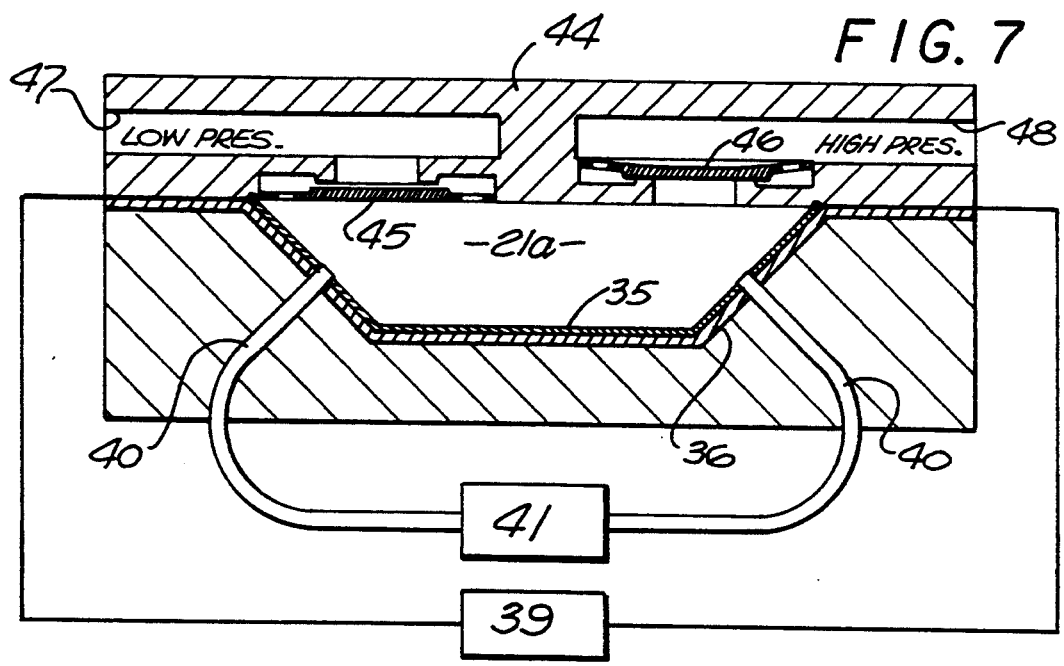

TRANSIENT ENERGY RELEASE MICRODEVICES AND METHODS

CROSS REFERENCE TO RELATED APPLICATION

This application is a continuation-in-part of the copending U.S. application Ser. No. 07/790,595, filed 8 Nov.1991, titled Transient Energy Release Microdevice and Methods now U.S. Pat. No. 5,186,001.

BACKGROUND OF THE INVENTION

The present invention relates to microactuators and micromotors and methods for operating microactuators and micromotors, all generally referred to herein as microdevices. In particular the invention relates to new and improved transient energy release microdevices of smaller size and improved efficiency operating under nonequilibrium conditions. The term microdevice includes reciprocating devices such as microcompressors and vacuum pumps as well as single stroke actuators and single throw and double throw electrical switches.

The present invention further relates to micromechanical devices and arrays of such devices which are non-volatile, and essentially radiation immune and insensitive to ambient conditions.

Considerable work is presently going on in the field of microdevices, which may be mechanical, electromagnetic, electrostatic, fluid or pneumatic in nature. By way of example, see:

*A Microminiature Electric-to-Fluidic Valve*, by Zdeblick and Angell in Transducers '87 page 827.

*Silicon micromechanics: sensors and actuators on a chip*, by Howe and Muller in IEEE Spectrum July 1990 page 29.

*Study on Microengines: Miniaturizing Stirling Engines for Actuators*, by Nakajima et al in Sensors and Actuators (1989) at page 75.

Uses for microdevices will be readily apparent, including those recited in the above publications and in the references cited therein.

Microdevices, including pumps and tools, have been considered for application in medicine, optics, microassembly, industrial process automation, analytical instruments, photonics and aerospace. The present invention is particularly directed to microdevices utilizing gas pressure for producing high output forces and power by heating and cooling of a gas. Problems arise in this type of microdevice with respect to efficiency because of heat losses to the walls in the gas chambers.

In other pneumatically driven devices supplied with gas through feed lines the pressure drop in such transmission lines will typically be in the tens of atmospheres for a 100 micrometer diameter line one meter long. Sealed devices have been proposed that rely on phase changes of a liquid charge. These devices are relatively slow acting with response times greater than 1 millisecond, whereas response times or cycle times of 10 microseconds are much more attractive for microscale devices.

It is an object of the present invention to provide a new and improved microdevice and method of operation utilizing a gas as the output power source with the gas operating in a nonequilibrium mode to provide reciprocating motion at a high repetition rate, while also operating at high efficiency.

It is a particular object of the invention to provide a microdevice with overall dimensions in the order of 100 micrometers or less while producing output forces in the order of $10^2$ to $10^4$ dynes and greater at cycle thermal efficiencies on the order of 10%.

It is a further object of the invention to provide such a microdevice wherein the gas in a cell is cyclically and directly heated to increase the gas pressure and provide the output force and is thereafter rapidly cooled to reduce the gas pressure to provide transient output force pulses at cycle times of not more than about 50 microseconds, and under certain circumstances not more than about 5 microseconds.

It is a particular object of the invention to accomplish gas heating by direct heating of the gas itself by photon energy directed into the cell and by electrical discharge in the gas within the cell, and by heating of the gas from the inner wall of the cell with the wall heated by photon energy directed onto the wall and with the wall heated by an electrical resistance film on the inner surface of the wall.

A further object of the invention is to provide such a microdevice in the form of a microactuator for providing a force as an output and in the form of a micropump for operating as a vacuum pump or compressor.

It is an object of the invention to provide a microdevice suitable for operation as an electrical switch and including a bistable membrane dividing the cell into two chambers, with the gas pressure increase being selective in the chambers to move the bistable membrane from one stable position to the other stable position.

An additional object of the invention is to provide micromechanical devices which can be configured as an electrical switch, memory cell, logic gate, and the like, and arrays of such devices, providing products which are non-volatile, and essentially radiation immune and insensitive to ambient conditions. A further object is to provide such items which can be manufactured using silicon process technology. Another object is to provide such devices which are capable of switching at gigahertz rates.

It is a particular object of the invention to provide micromechanical devices which are competitive with conventional CMOS devices in size, speed, and energy consumption for a number of electronic applications. With a characteristic size of approximately 1 micrometer, the devices of the invention are capable of switching states in less than 1 nanosecond using less than 1 picojoule per state change. Further, energy loss through friction is eliminated as there is no sliding contact between moving parts.

Another object of the invention is to provide such devices suitable for manufacture in arrays for use as cross-bar switches, logic elements, and memory cells. An additional object is to provide such devices for use as dynamic mirrors.

A further particular object is to provide such devices which can operate with a sealed pressure chamber and without a sealed pressure chamber, the latter being possible due to the small size and rapid response with state changes occurring before the pressure pulse in the chamber dissipates. In the unsealed chamber version, performance is enhanced by an increase in the rate at which energy is dissipated and an automatic compensation for ambient temperature effects.

Other objects, advantages, features and results will more fully appear in the course of the following description.

SUMMARY OF THE INVENTION

A microdevice for providing reciprocating motion at a high repetition rate, including a cell having an output wall with at least a portion movable, such as a diaphragm or a set of valves, to provide an actuating force, a charge of gas in the cell, and means for cyclicly and directly heating the gas to increase the gas pressure in the cell and move the diahargm or control the valves, with the means for heating including pulse means for generating transient gas pressure increases in the cell for periods or cycles of not more than about 50 microseconds, and with the cell including means for cooling said gas for reducing the gas pressure in said cell. In one embodiment, the means for cooling includes a cell wall of a material of good thermal conductivity. In another embodiment, the means for cooling includes a multi-layer cell wall with an inner layer of a material of low thermal conductivity on an outer layer of material of good thermal conductivity.

In one embodiment, the means for heating includes a source of photons and means for directing said photons into the gas. In another embodiment the means for heating includes a thin insulating layer on the inner surface of the cell which layer is heated directly by photons. In another embodiment, the means for heating includes a thin film of resistance heating material on the inner surface and covering a majority of the inner surface of said cell, and means for connecting a pulsed electric power source to said film. Another embodiment provides gas heating by pulsed electrical discharges within the gas.

Another embodiment of the invention includes a microdevice for switching motion having a bistable membrane dividing the cell into two chambers, with gas heating and cooling in selected chambers to move the membrane between the stable states, and additional electrical conductors in the cell for contact with the electrical conducting membrane to open and close circuits. The invention also includes arrays of such switches for use as crossbar switches, logic elements, memory cells and the like, as well as single devices for optical switching with dynamic mirrors.

The invention also includes particular details of the means for heating and means for cooling as are described and claimed herein below.

BRIEF DESCRIPTION OF THE DRAWINGS

FIG. 5 is a view similar to those of FIGS. 2, 3 and 4 showing another alternative embodiment of the invention;

FIG. 6 is a view similar to those of FIGS. 2-5 showing another alternative embodiment of the invention;

FIG. 7 is a view similar to those of FIGS. 2-6 showing another alternative embodiment of the invention;

DESCRIPTION OF THE PREFERRED EMBODIMENTS

Figure 1:
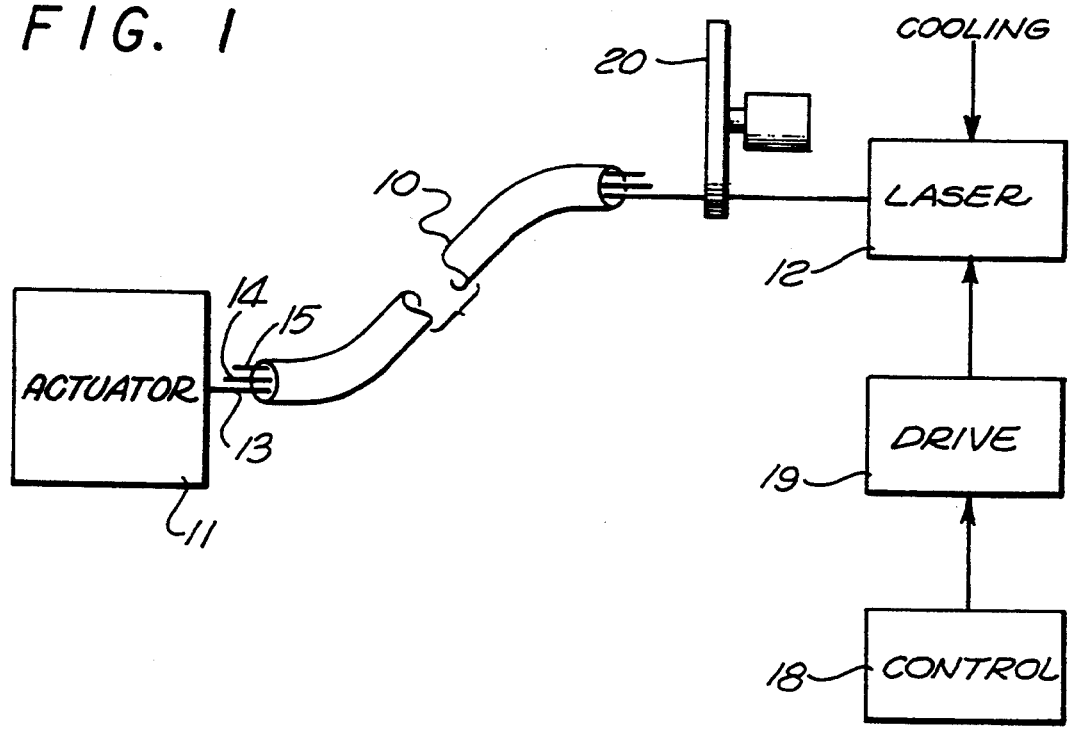
FIG. 1 is a diagram illustrating the use of a microactuator for powering a tool or the like in a catheter or endoscope.

FIG. 1 illustrates a catheter 10 with a microactuator 11 at the distal end and a laser 12 at the proximal end. The catheter may be conventional in construction and includes a fiber optic 13 for coupling the output of the laser 12 to the actuator 11. Another fiber optic 14 may be included for viewing, and other lines 15 may be utilized for other conventional purposes. The laser 12 may be conventional in construction and operation and typically includes a control 18, a drive unit 19, and a beam chopper 20 for producing photon pulses to the actuator 11. Alternatively, a pulsed laser may be used.

Figure 2:
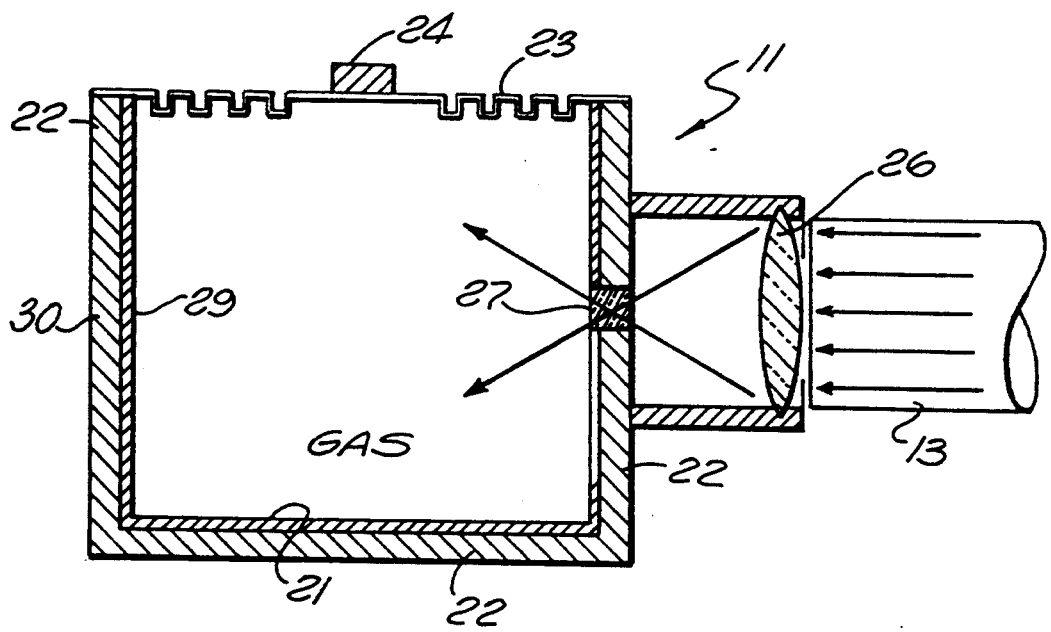
FIG. 2 is an enlarged sectional view through the actuator of FIG. 1.

One form for the microactuator 11 is shown in greater detail in FIG. 2, with the distal end of the fiber optic 13 positioned at the microactuator.

The microactuator includes a cell 21 with relatively rigid walls 22. One of the walls includes a diaphragm or other flexible member 23. A tool or shaft or other output member 24 is carried on the flexible member 23 for motion with the member 23.

The cell 21 is charged with a gas and sealed so that there is no gas flow in or out. Photons from the laser are directed into the gas within the cell through a lens 26 and a photon transparent window 27 in a wall of the cell.

In the embodiment illustrated, the cell wall is a multilayer wall, with an inner layer 29 of a material of good thermal conductivity and a second layer 30 over the inner layer to serve as an additional heat sink. Typically the layer 29 will be in the order of 5 to 100 micrometers thick. In an alternative embodiment, the thermal conducting wall 29 may be used alone. In another embodiment, a thin thermal insulating layer can be used on the inner surface of the layer 29 to lengthen the gas cooling time.

In operation, energy is transmitted through the window 27 directly into the gas, heating the gas. The increase in gas pressure resulting from the heating moves the flexible member 23 outward, providing a force at the output member 24. Almost instantaneously after being heated by the photon energy pulse, the gas is cooled by heat transfer from the gas through the layer 29 to the heat sink 30. The resultant decrease in pressure in the gas permits the flexible member 23 to return to its normal position. Thus the desired cyclic force at the output member 24 is obtained.

The laser pulses with a duration typically of less than 1 microsecond are provided at cycle times of not more than about 50 microseconds, and preferably at cycle times of not more than about 5 microseconds, to provide the nonequilibrium generation of transient pressure increases within the cell. The high repetition rate is achieved by means of the direct heating of the gas rather than by heating the gas through the cell wall or by introducing heated gas from outside the cell, followed by the rapid cooling of the gas through the cell wall due to the large surface-to-volume ratio of the microvolume of the cell. The cell typically is square or cylindrical with outside dimensions no more than about 100 micrometers. In another embodiment in order to decrease cooling time, or increase the deflection of the membrane, a pancake shaped cell may be used with the height (perpendicular to the membrane) smaller than the horizontal dimensions, typically up to ten times smaller.

The gas used in the cell should preferably be a gas having an electronic resonant absorbtion feature in the visible, near infrared or near ultraviolet spectral region. Gases with vibrational absorption features in these spectral ranges may also be used although their initial pressures would have to be higher (10's of atmospheres) in order to absorb efficiently. Typical suitable gasses are NO, $CO_2$, $NO_2$, $NH_3$, and $I_2$.

It is desirable for maximum efficiency of operation, to match the laser and the gas so that the gas has a photon absorption band corresponding to a wavelength of the laser. Examples of corresponding gas and laser are: NO and ArF plus dye; $O_2$ and ArF; $NH_3$ or $NO_2$ and KrF plus dye; and $I_2$ and Ar+.

The high thermal conductivity layer 29 typically may be silicon, which has a thermal conductivity of 1.49 watts per centimeter per degree Kelvin. Other materials with a thermal conductivity not less than about 0.1 watts per centimeter per degree Kelvin can be used, including nickel. The heat sink 30 may be a layer of metal including silicon or a Peltier device or other refrigeration system. A heat sink may also be provided by directing a cooling liquid or gas flow along the layer 29 or the layer 30.

Figure 3:
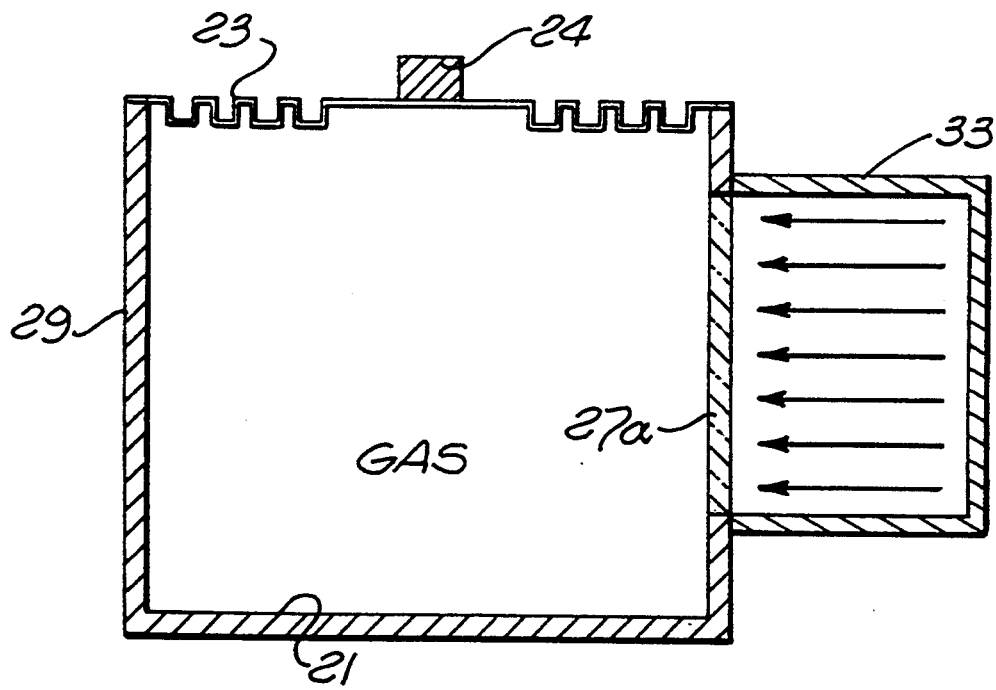
FIG. 3 is a view similar to that of FIG. 2 showing an alternative embodiment of the actuator.

An alternative construction for the microactuator is shown in FIG. 3, wherein components corresponding to those of FIG. 2 are identified by the same reference numbers. In the embodiment of FIG. 3, a diffusing lens 27a is used in place of the lens 26 and the window 27 of the embodiment of FIG. 2. Also, the photon source is mounted directly at the outer wall of the cell in a lamp housing 33. The cell is formed as a single layer 29 of high thermal conductivity material, with cooling occuring by radiation into the ambient atmosphere through the wall. The operation of the microactuator of FIG. 3 is the same as that of FIG. 2.

Figure 4:
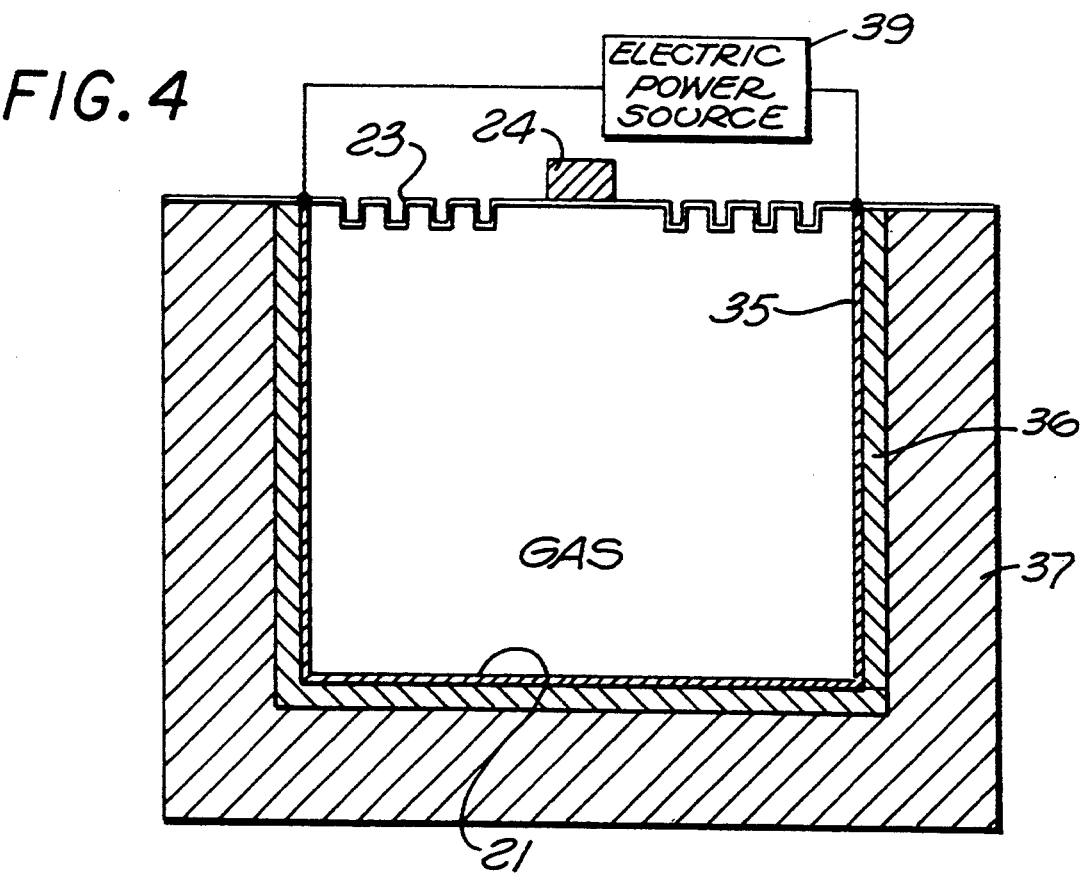
FIG. 4 is a view similar to that of FIGS. 2 and 3 showing another alternative embodiment of the actuator of the invention.

Further alternative embodiments for the microactuator construction are shown in FIG. 4, with the cell 21, flexible member 23 and output member 24. In this embodiment, the inner layer 35 of the cell is a very thin film of electrical resistance material, typically a layer of tungsten or other high temperature resistant electrical conductor in the order of 1 to 5 micrometers thick.

The electrical resistance film is applied over another layer 36 of the cell which is of a material of very low thermal conductivity, preferably not more than about 0.01 watts per centimeter per degree Kelvin. A nonporous ceramic is a preferred material for the layer 36, having a thermal conductivity of 0.004 watts per centimeter per degree Kelvin. The layer 36 typically is in the order of 1 to 10 micrometers thick, and typically is carried on a substrate 37 which is a material of relatively high thermal conductivity, preferably at least 0.5 watts per centimeter per degree Kelvin, typically silicon. This layer 37 should be thick enough to provide the physical support for the cell but the thickness is not critical.

An electric power source 39 is connected to the film 35 and is operated to provide power pulses typically of durations between 1 and 10 microseconds at periods greater than 10 microseconds.

With this arrangement, the heat generated in the thin film 35 is primarily directed into the gas substantially instantaneously to heat the gas and increase the pressure. There is a relatively slow flow of heat from the film 35 through the thermal insulating layer 36 to the substrate 37 during the time the gas is heating. The thickness and thermal characteristics of the layer 36 are selected so that the gas will cool during the interval between energy pulses, returning the gas to the normal pressure. With this arrangement, the desired nonequilibrium characteristic and transient pressure increases in the cell are produced, resulting in the reciprocating motion of the member 24 at the high repetition rate.

A further alternative embodiment of the invention is shown in FIG. 5, wherein the gas in the cell is heated by heating the inner wall of the cell with light from the exterior of the cell. In this embodiment a thin layer of a thermal insulator 36, preferably a non-porous ceramic with thermal conductivity less than 0.005 watts per centimeter per degree Kelvin, is provided as the inner surface of the cell 21, with the layer 36 carried on a substrate 37, as shown in FIG. 4. Light from a laser is introduced into the volume through a window, such as by the lens 27a and lamp housing 33 of FIG. 3, for periods preferably from about 1 to 10 microseconds. Total energy in the light pulse should be from about 10 to 100 microjoules. The insulating layer 36 should be between about 1 and 10 micrometers thick with the material 37 on which it is deposited being a good thermal conductor, preferably with thermal conductivity greater than about 0.5 watts per centimeter per degree Kelvin.

The energy for this laser heated wall mode of operation can be provided at arbitrary frequencies over a wide range of wavelengths. Thus a laser diode would be a good candidate source and could be mounted in close proximity to the microdevice. In general it is preferable to introduce the light, using a small fraction of the surface area, into the volume with an angular dispersion large enough to illuminate substantially uniformly the inner walls of the cell. In operation, the inner wall of the cell is rapidly heated by the light energy burst, with the gas being heated by the hot cell wall and with minimal heat loss through the layer 36. When the energy source is shut off the cell wall and the gas cool by heat flow to the sink 37, completing the heating and cooling cycle.

An alternative embodiment of the microdevice of FIG. 5 with multiple entry to the cell for improved uniform coverage of the cell inner wall is illustrated in FIG. 6. The pancake cell configuration is used with the internal dimension of the cell typically being 33 micrometers high, 170 micrometers long and 170 micrometers wide. Light energy may be introduced into the cell from each end through surface waveguides 40 positioned in the substrate 37. The waveguides may be illuminated from a single pulsed source 41, or by two sources operating in synchronism.

Gases for use in the microdevice of FIG. 4 should be chosen for the particular situation. For the most rapid gas heating, helium or hydrogen is preferred. For cases where slower reponse times are appropriate, nitrogen or argon might be used. However for applications where the wall heating mode is used for a compressor or vacuum micropump, the gas will be defined by needs outside of the requirements of the response times of the energy release cell. The configuration of FIG. 6 with the cell kept small in one dimension can be advantageous because it shortens the characteristic cycle time since the heating and cooling times depend on the second order of the dimensions of the volume. Thus the chamber in FIG. 6 which has about the same volume as a cubic chamber 100 micrometers to a side would heat or cool about ten times quicker than the cubic shape.

Figure 8:
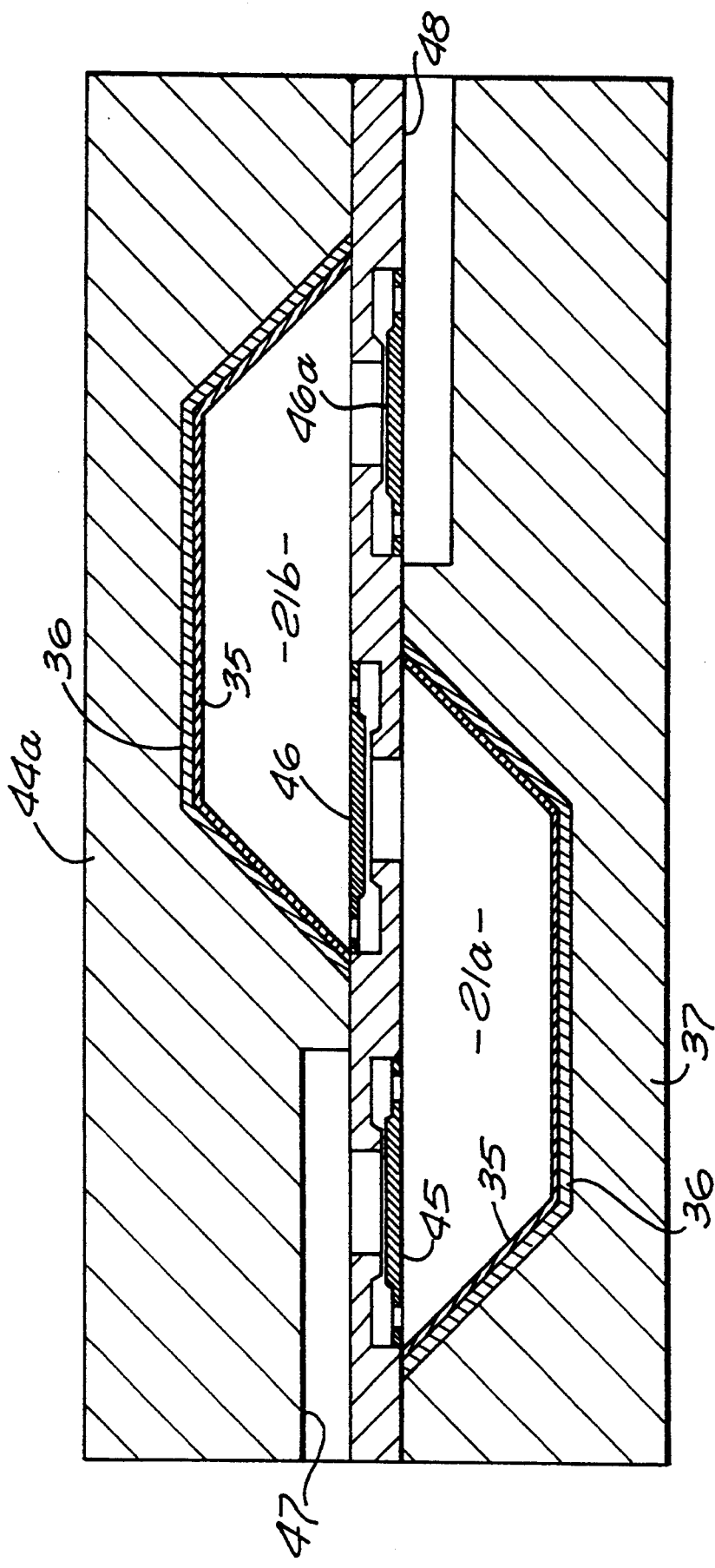
FIG. 8 is a view similar to that of FIG. 7, showing two of the microdevices constructed in cascade.

A microdevice suitable for use as compressors and vacuum pumps is shown in FIGS. 7 and 8. A single microcompressor or vacuum micropump is illustrated in FIG. 7, and two FIG. 7 units cascaded to produce higher pressure ratios are illustrated in FIG. 8. In the embodiment illustrated, the cell 21a typically is about 30 by 150 by 150 micrometers with a thin electrical resistance film 35 over a low thermal conductivity layer 36 on a substrate 37, for electrical pulse heating. Alternatively the wall layer 36 can be heated by light pulses as previously described.

A top member or cover 44 is used in place of the diaphgram 23, with an inlet valve 45 and an outlet valve 46 in the cover. The valves are preferably passive and could be flapper valves or of the type described by Esahi et al in Sensors and Actuators, volume 20, 1989, pages 163-170. The valve 45 provides a flow path from an inlet passage 47 to the interior of the cell, and the valve 46 provides a flow path from the cell to an outlet passage 48. With the gas in the cell at normal temperature, the valve 45 is open and the valve 46 is closed. When the gas is heated and expands, the increase of pressure in the cell closes the inlet valve 45 and forces gas out through the outlet valve 46 into the outlet passage 48. When the gas cools and the pressure in the cell drops, the inlet valve returns to its normal open condition, and the outlet valve is closed by the higher pressure in the outlet passage, permitting gas to flow into the cell from the inlet passage. Thus it is seen that the microdevice can function as a compressor or pump for the gas and as a vacuum pump.

Except in very unusual circumstances the working gas being compressed or pumped will likely not be a convenient absorber of photon energy, thus the transient wall heating mode of operation, such as is shown in FIGS. 4 and 5 will be necessary. In order for the microdevice to have as low a characteristic response time as possible, it will be preferable for the energy release cell or chamber to have a pancake shape. The volume described for the cell of FIG. 7 for instance would have a cycle time of about 20 microseconds. The response time of the cell is important in the wall heating case since the total energy per pulse required to reach a certain peak wall temperature varies with the time that the wall heat source is on. The shorter the heating time, the more efficient the microdevice.

In the embodiment of FIG. 8, two of the pumps of FIG. 7 are connected in cascade to provide an increase in performance. The valve 46 functions as the outlet valve for the cell 21a and as the inlet valve for the cell 21b. Another valve 46a is the outlet valve for the cell 21b. A cover 44a serves as the substrate for the cell 21b and as the cover for the cell 21a, while the substrate 37 serves as a cover for the cell 21b. The operation of the cells is as described for FIG. 7, with the two cells being energized alternatively.

Figure 9:
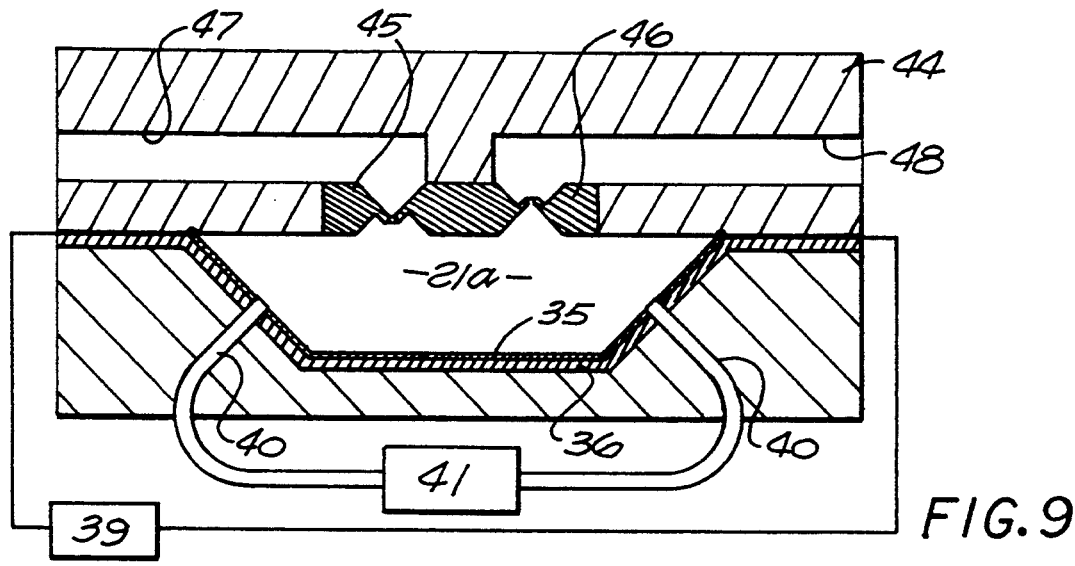
FIG. 9 is a view similar to that of FIG. 7 showing an alternative valve construction.

An alternative construction for the valves 45, 46 is shown in FIG. 9, where the valves may be of the type shown by Smith and Hok, Proceedings of 1991 of International Conference on Solid State Sensors and Actuators pages 1049-1051.

Figure 10:
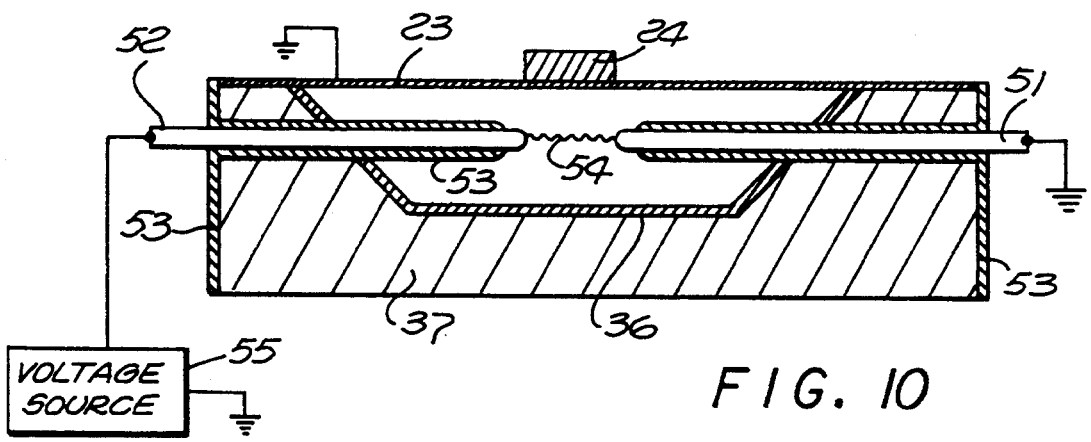
FIG. 10 shows another alternative embodiment using gas discharge for the transient energy release in a microactuator.
Figure 11:
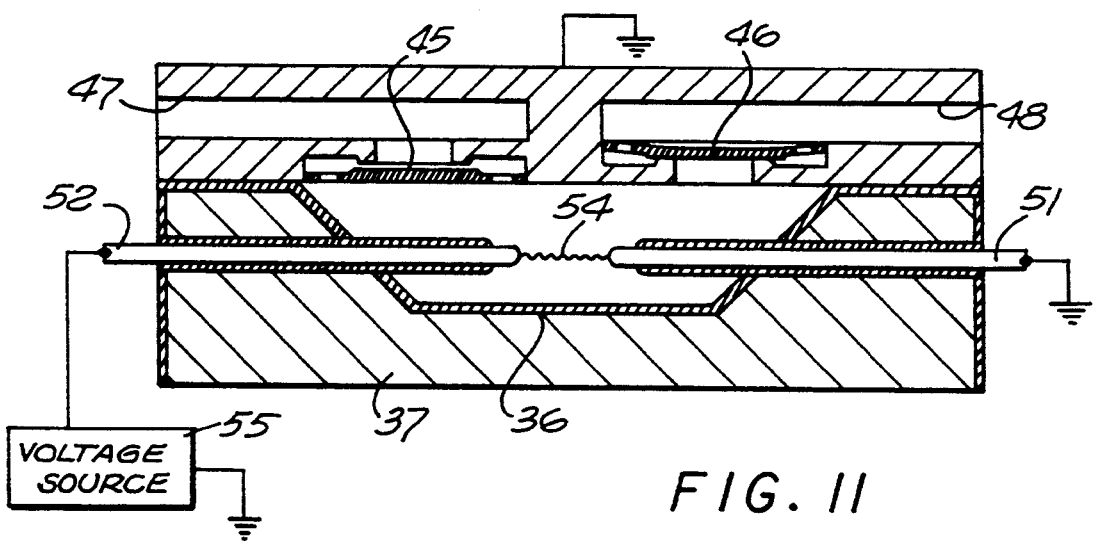
FIG. 11 is a view similar to that of FIG. 10 for a microcompressor or pump configuration.

In another alternative embodiment of the invention the transient energy releases in the cell are produced using a gas discharge or spark within the cell. A microactuator of the diaphragm type with gas discharge operation is shown in FIG. 10, and micropump type is shown in FIG. 11, with components corresponding to those of earlier drawing figures identified by the same reference numbers.

Electrodes 51, 52 are positioned within the cell, separated by electrical insulating material 53, with the inner ends of the electrodes positioned to approximately center the discharge 54 between the electrodes in the cell. A voltage pulse source 55 is connected across the electrodes, preferably with one electrode and the structure connected to ground.

In operation, a voltage pulse applied to the electrodes produces a discharge between the electrodes in the gas in the cell, resulting in an increase in gas pressure. After the termination of the pulse, the gas cools and the pressure drops. By way of example, the breakdown potential for an electrode spacing of 50 micrometers is around 200 volts for argon at one atmosphere of pressure. The corresponding field strength is 40 kv per cm. Very short current pulses can be formed by applying short voltage pulses, typically of duration less than one microsecond, to the electrode by known techniques. Preferably a positive voltage pulse will be used with the other electrode being at ground. In order to deposit 1 microjoule of energy in the gas for heating the gas, a 10 milliamp current across a 200 volt potential needs to flow for about 1 microsecond, taking into consideration normal losses in operation. Since a discharge can be initiated in all gases of practical interest, the discharge heating mode for the cell gas is of particular application to vacuum micropumps and microcompressors operating in various ambient gases. In this embodiment the thermally insulating wall layer 36 can be used to control the length of the pressure pulse and in some applications may not be necessary.

Figure 12:
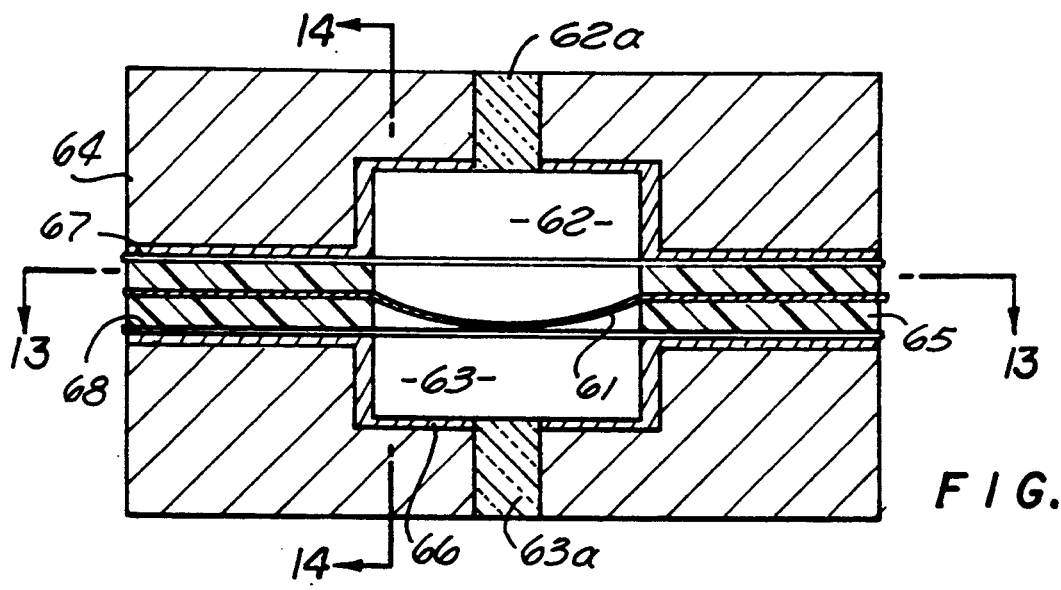
FIG. 12 is a vertical sectional view through another alternative embodiment of the invention illustrating an electrical switch.
Figure 13:
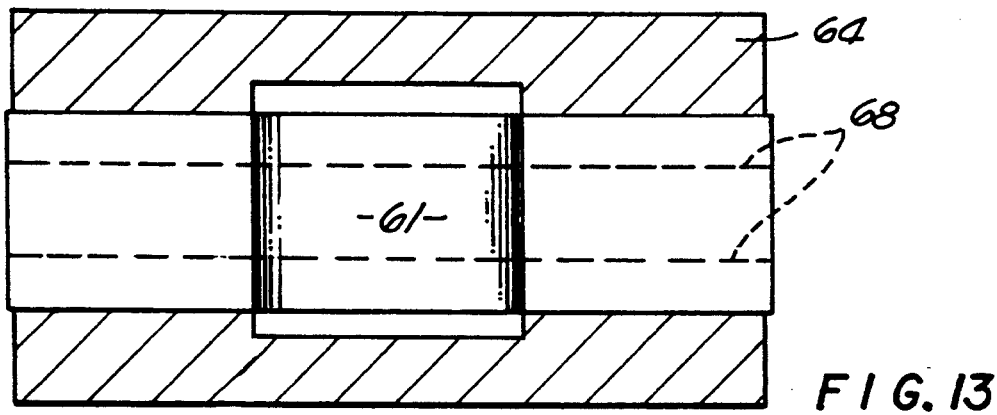
FIG. 13 is a sectional view taken along the line 13—13 of FIG. 12.
Figure 14:
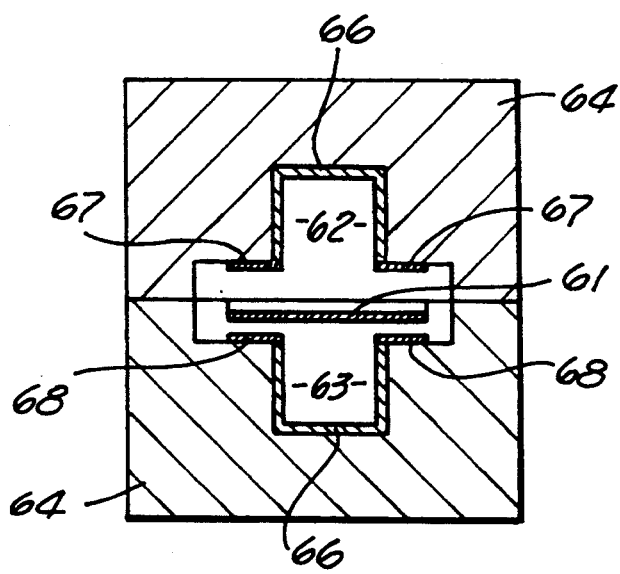
FIG. 14 is a sectional view taken along the line 14—14 of FIG. 12.

An alternative embodiment of the invention is shown in FIGS. 12-14, with a bistable membrane 61 dividing the interior of the cell into two chambers 62, 63. The membrane is shown in the lower stable state in FIG. 12. Pulsing the gas in the lower chamber 63 causes an increase in gas pressure which moves the membrane from the position shown to an upward position with the membrane in the upper stable state, that is from a stable, concave, downward configuration to a stable, concave, upward configuration. Subsequently pulsing the gas in the upper chamber 62 will then move the membrane back to its position as shown in FIG. 12.

The construction of the device of FIGS. 12-14 may be conventional, including a substrate 64, typically silicon, electrical insulation 65, typically ceramic, and absorbtive heater 66, typically gold, aluminum, platinum or other material which is opaque to photons. Electrical conductors 67, 68 on the substrates provide for electrical contact with the electrical conducting membrane 61, with the membrane and the conductor 68 shown in contact in FIG. 12. When the gas pressure in the lower chamber 63 is increased, the membrane is moved to the upper position, providing electrical contact between the membrane and the conductor 67. Typically, the conductors 67, 68 are platinum, desirably being compatible with the other materials in the device. The membrane typically is a layered construction of conductive metal and silicon dioxide.

Photons may be directed into the chambers 62, 63 through photon transparent windows 62a, 63a, respectively. An alternative configuration is shown in FIG. 15 where the gas heating is achieved with an electrical resistive heater 70, preferably with a thermal insulator 71 between the resistive heater and the substrate.

The operation of the devices of FIGS. 12-15 is the same as described above for the earlier described devices with a movable diaphragm or other flexible member 23. As best seen in FIG. 14, there is no requirement that the upper and lower chambers be sealed from one another, preferably having gas flow paths between the upper chamber and the lower chamber around the sides of the membrane. The operating time of the cell is so short that membrane motion is achieved before any equalizing of gas pressures in the chambers can occur through the flow paths around the sides of the membrane. Of course, if desired, the two chambers could be separately sealed. While a rectangular configuration is shown for the devices of FIGS. 12-15, a circular shape or other shape can be used if desired.

The switch device as illustrated in FIGS. 12-15 will function as a single pole, double throw switch. If for any reason, a single throw switch is desired, one of the conductors 67, 68 can be omitted.

Figure 15:
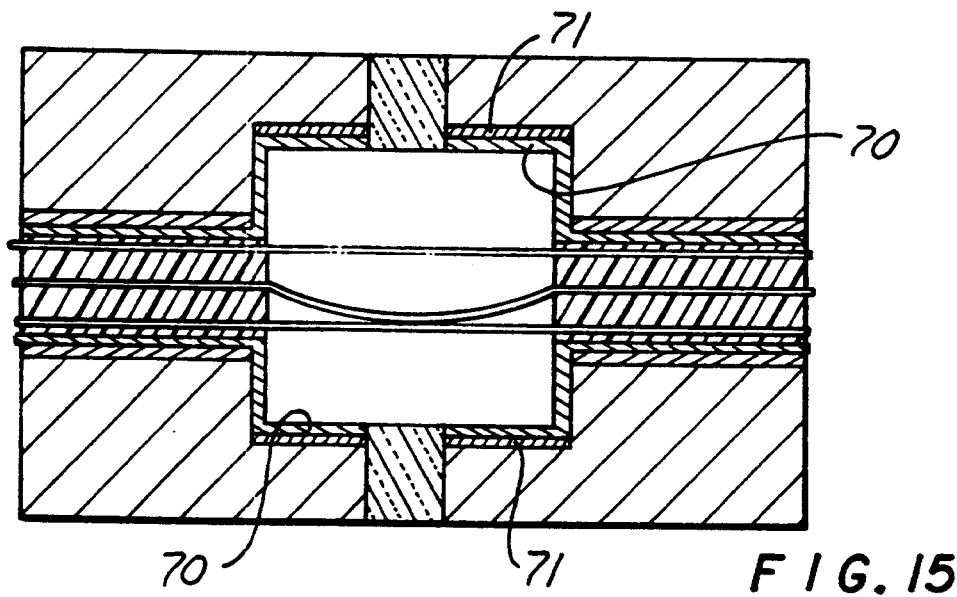
FIG. 15 is a view similar to that of FIG. 12 showing another alternative embodiment.

To fabricate the device shown in FIG. 15 first etch a shallow recess in silicon by masked implantation and subsequent selective chemical etching. For producing chamber depths of about one micrometer, high dopes of boron provide the doping levels to allow 100% selective etching. After chamber formation, $SiO_2$ is deposited conformally and the resistive heating element is evaporated. A second $SiO_2$ layer is deposited followed by the metal membrane layer. Another $SiO_2$ layer is deposited followed by the top electrode layer and final thick dielectric layer. In one process, a hole is formed in the center of the device using reactive ion etching and the $SiO_2$ layers are undercut leaving the membrane in a free position. The ceramic insulator layers are not etched by the HF allowing the needed undercut to provide the required space above and below the membrane. In another process sequence, a semi-sealed chamber design is used. This may be acheived by depositing the metal membrane so that it is anchored only on two opposite sides of the chamber. Subsequent plasma CVD deposition of $SiO_2$ will planarize the surface filling the edges in the gap space between the membrane and the two other chamber walls. The rest of the fabrication process is then similar to the first case.

Additional information on fabrication of micromechanical elements may be found in the following papers:

*Design and Fabrication of Micromechanical Logic Elements*, by Bergstrom et al in IEEE Proceedings, 1990, CH2832-4/90/40-0015, pages 15-20.

*On a Nonvolatile Memory Cell Based on Micro-Electo-Mechanics*, by B. Halg, in IEEE Proceedings, 1990, CH2832-4/90/40-0172, pages 172-176.

*On a Micro-Electro-Mechanical Nonvolatile Memory Cell*, by B Halg, in IEEE Transactions on Electron Devices, Vol. 37, No 10, October 1990, pages 2230-2236.

Figure 16:
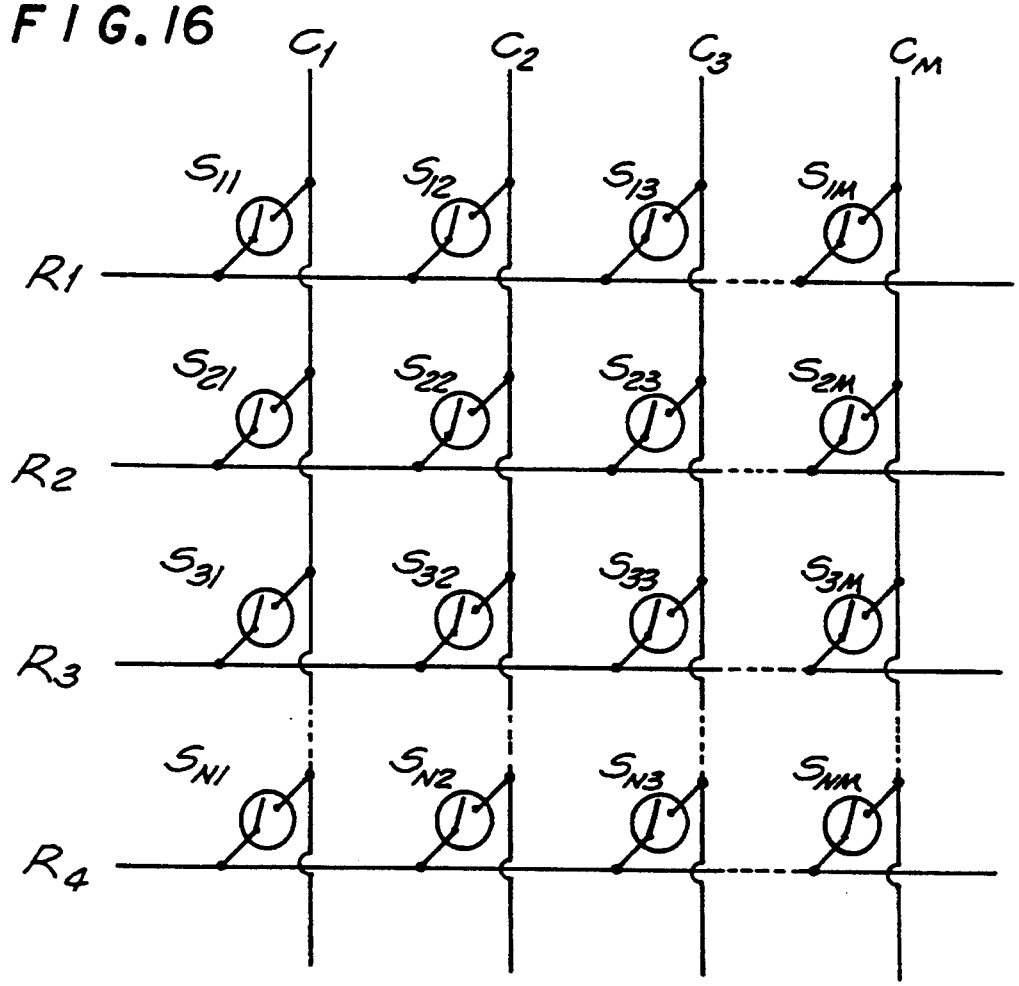
FIG. 16 is a diagram of an array of the switch devices of FIGS. 12 and 15 utilized as a crossbar switch.

The micromechanical switch of FIGS. 12 and 15 is exceedingly small and is readily used in arrays for a variety of purposes. A crossbar switching array is shown in FIG. 16, where switches $S_{11}$-$S_{NM}$ provide interconnnections between conductors $C_1$-$C_M$ and $R_1$-$R_N$. Each of the switches $S_{11}$-$S_{NM}$ is a single pole, single throw version of FIG. 12 or FIG. 15.

The simple crossbar switch shown in FIG. 16 can be fabricated using standard 1.2 micrometer CMOS technology with a plurality of the switches of FIG. 12 or FIG. 15. Because in a CMOS type switch, the gate capacitance of a 1.2 micrometer×1.8 micrometer device is approximately 4 fF, one must drive nearly 16 fF of capacitance to switch 1 mA of current. Assuming a 3 V supply voltage, this would correspond to a switching energy of $E = \frac{1}{2} CV^2$ of 1.5 pJ. For a similarly sized micromechanical switch using the new device shown in FIG. 12, significantly more current (>10 mA) may be switched because the current path is through the thin metal membrane. While the switching energies are comparable, the higher current capacity for a given switching energy results in a larger through bandwidth and permits the realization of a larger crossbar.

The main limitation of the CMOS crossbar may be understood by considering the source and drain diffusion capacitance. The capacitance for a 1.2 micrometer gate is given by $$C_{diff} = 0.29(a \times b) + 0.36(2a + 2b) \frac{fF}{\mu m^2}$$

where a×b represents the area not covered by the intersection of the gate and diffused region and the second term term represents the fringe capacitance. For a device capable of switching 1 mA, this capacitance is approximately 25 fF. With $Q_{11}$ on, the input at $R_1$ must change not only the source and drain diffusion capacitance of $Q_{11}$ but also the diffusion capacitance along the entire column $C_1$. Therefore, large switches of this type are capacitively limited by the RC time constant associated with the full data path.

On the other hand, the micromechanical crossbar switch of the present invention does not suffer from diffusion capacitance. Instead, the through bandwidth is limited by the wiring capacitance which for a 1.2 micrometer CMOS process is about 100 fF per 0.6 mm of line length. Thus the wiring capacitance represents only a small fraction of the diffusion capacitance. Therefore, large arrays of micromechanical crossbar switches capable of reset times under 1 ns and GHz through bandwidth are possible with standard silicon technology.

In another embodiment, a plurality of the micromechanical switches can be constructed in an array to serve as logic elements, such as AND gates, OR gates, more complex gates, and combinations thereof. In another embodiment, the switches may be connected in arrays to serve as memory cells, either single pole, single throw or both double throw. A significant advantage of such a construction is the capacity of such arrays. Typically, 100 megabytes of nonvolatile memory can be obtained in a silicon structure about $4'' \times 4'' \times \frac{1}{2}''$. Such a device does not require any power to retain the memory condition and, hence, is not affected by loss of power and also is not affected by electromagnetic fields in the region of the memory.

Figure 17:
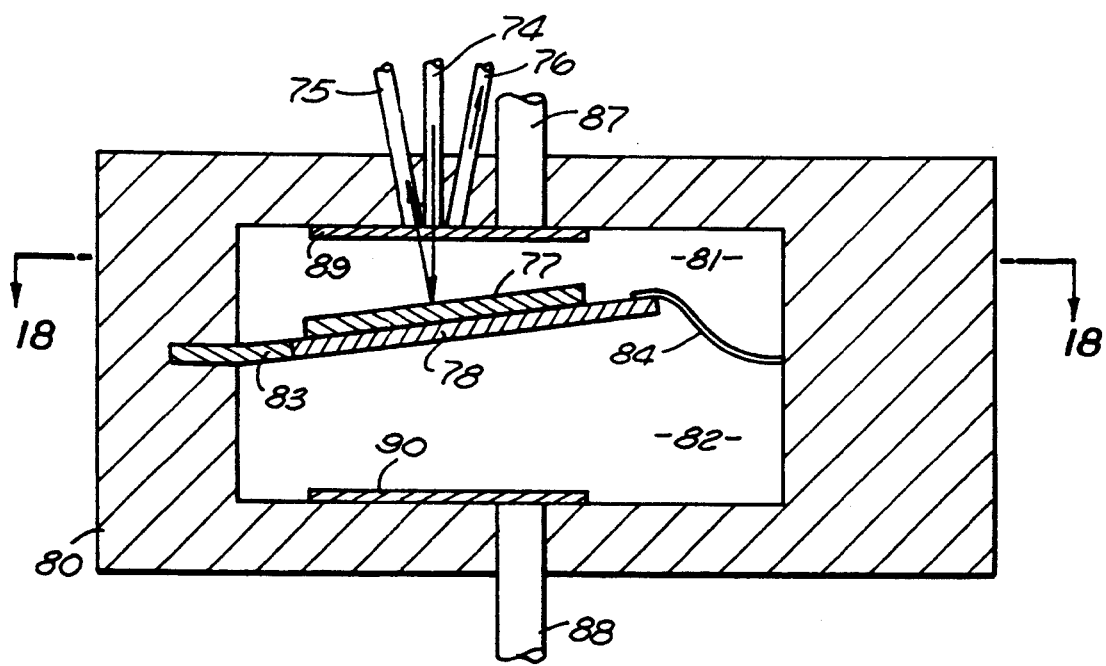
FIG. 17 is a view similar to that of FIGS. 12 and 15 illustrating another embodiment operable as a dynamic mirror.
Figure 18:
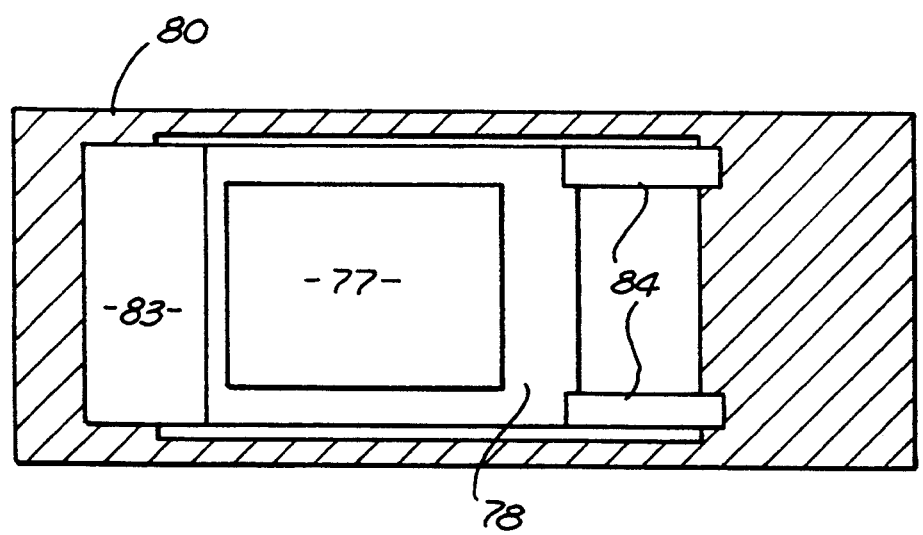
FIG. 18 is a sectional view taken along the line 18—18 of FIG. 17.

Another embodiment of the invention for use as a dynamic mirror for switching light paths in fiberoptic systems is illustrated in FIGS. 17 and 18. Light through an incoming fiberoptic 74 is selectively directed to an outgoing fiberoptic 75 and another outgoing fiberoptic 76 by a mirror 77 carried on a bistable membrane 78.

The device includes a substrate 80 with interior chambers 81, 82, with the membrane 78 supported in the substrate by a hinge 83. The end of the membrane 78 opposite the hinge 83 is connected to the substrate by one or more bridges 84.

In the embodiment illustrated, the gas is heated in the chambers by photons directed through photon conductors 87, 88 to photon absorbrive heater layers 89, 90, respectively. The other arrangements for heating the gas described above may also be utilized if desired. In some constructions, a lens or a light pipe or a light passage may be incorporated in the substrate for the photons. In another arrangement, the substrate may be sufficiently transparent to the photon radiation that the photons can be delivered to the exterior of the substrate and pass through the substrate to the absorbtive heater material.

The substrate and the membrane typically are silicon or polysilicon or the like. The hinge is flexible and may be made of any suitable elastic material, including a thinner layer of the substrate material. The mirror is a suitable reflector, typically aluminum. The bridge member or members are formed of a material having a lower coefficient of thermal expansion than the substrate, such as silicon dioxide. The bridge operates as a buckled beam, which is bistable, with a first stable state in the upper S-curve position shown in FIG. 17 and a second stable state in a lower position with the S-shape having the opposite curvature.

The general construction and use of a dynamic mirror or deformable mirror is described in the paper *Deformable mirror device spatial light modulators and their applicability to optical neural networks*, by Collins et al, in Applied Optics, Vol. 28 No. 22, 15 Nov. 1989, pages 4900–4907. The device of FIGS. 17 and 18 may be utilized in the same manner, operating as a double throw switch to outlets 75, 76, and as a single throw switch with only one of the outlets.

Devices such as those shown in FIGS. 12–15 can be densely arrayed to create switch, logic, and memory banks. Among the advantages offered by such digital microelectromechanical devices are non-volatility, radiation immunity, large operating temperature range, automatic temperature compensation, and the potential for an enormous number of programming cycles.

While it is prefered that the cell be sealed so that it does not leak, small leaks along the contact surfaces or through the walls can be tolerated because of the very short response time achieved with the mechanical motion immediately following the energy pulse. Leakage of gas at increased pressure is relatively slow compared to the micromechanical response time so that such leakage would not adversely affect operation. Of course, if the device is operated in a vacuum such that leakage would ultimately deplete the gas supply, the cell would not function. Similarly, if the gas within the cell was sufficiently contaminated with a constituent which did not respond to the energy pulse or responded very slowly, the cell would ultimately become inoperable. However, since the cell operates at speeds in the gigahertz range, with cycle times in the order of 1 nanosecond, some leakage would not be significant.

We claim:

1. A microdevice for providing motion at a high repetition rate, including in combination:
   a cell having a membrane separating the interior of said cell into two chambers, with at least a portion of said membrane movable;
   a charge of gas in said cell; and
   means for directly heating said gas selectively to increase the gas pressure in one of said chambers and move said membrane portion,
   said means for heating including pulse means for generating transient gas pressure increases in a chamber;
   said cell including means for cooling said gas for reducing the gas pressure;
   with said movable membrane portion being bistable and having first and second stable positions and movable from one of said positions to the other of said positions by change in gas pressure in said chambers of said cell.

2. A microdevice as defined in claim 1 wherein said membrane is an electrical conductor, and said cell includes an electrical conducting wall portion, with said membrane positioned to contact said electrical conducting wall portion when said membrane is in one of said stable positions providing a single throw electrical switch.

3. A microdevice as defined in claim 1 wherein said means for heating includes a source of photons and means for directing said photons into said cell.

4. A microdevice as defined in claim 1 wherein said means for heating includes:
   a thin film of resistance heating material on an inner surface of said cell; and
   means for connecting a pulsed electric power source to said film.

5. A microdevice as defined in claim 1 wherein said means for heating includes excitation means for producing an electrical discharge in said gas in said cell.

6. A microdevice as defined in claim 1 including means defining a gas flow path around said membrane between said chambers.

7. A microdevice as defined in claim 1 wherein said membrane is an electrical conductor, and said cell includes an electrical conducting wall portion in each of said chambers, with said membrane contacting the electrical conducting wall portion of one of said chambers when said membrane is in one of said stable positions and contacting the electrical conducting wall portion of the other of said chambers when said membrane is in the other of said stable positions providing a double throw electrical switch.

8. A microdevice as defined in claim 1 wherein said pulse means includes means for generating transient gas pressure increases in a chamber at cycle times of not more than about 50 microseconds.

9. A microdevice as defined in claim 1 wherein said pulse means includes means for generating transient gas pressure increases in a chamber at cycle times of not more than about 5 microseconds.

10. A microdevice as defined in claim 1 wherein said movable membrane portion includes a reflector.

11. A microdevice as defined in claim 10 including means for directing a light beam through said cell onto said reflector and means for directing light reflected from said reflector through said cell to the exterior when said membrane is in one of said stable positions providing a single throw light switch.

12. A microdevice as defined in claim 10 including means for directing a light beam through said cell onto said reflector and means for directing light reflected from said reflector through said cell to the exterior when said membrane is in each of said stable positions providing a double throw light switch.

13. A switching circuit comprising a plurality of cells in a X-Y array having a plurality of X paths and a plurality of Y paths, with a separate cell connecting each X path to each Y path, each of said cells comprising a microdevice having an electrical conducting membrane separating the interior of said cell into two chambers, with at least a portion of said membrane movable;

a charge of gas in said cell; and means for directly heating said gas selectively to increase the gas pressure in one of said chambers and move said membrane portion, said means for heating including pulse means for generating transient gas pressure increases in a chamber;

said cell including means for cooling said gas for reducing the gas pressure;

with said movable membrane portion being bistable and having first and second stable positions and movable from one of said positions to the other of said positions by change in gas pressure in said chambers of said cell, and with said cell having an electrical conducting portion for contact by said membrane when said membrane is in one of said stable positions.

14. A microdevice as defined in claim 13 wherein said membrane is an electrical conductor, and said cell includes an electrical conducting wall portion, with said membrane positioned to contact said electrical conducting wall portion when said membrane is in one of said stable positions providing a single throw electrical switch.

15. A method for providing switching motion at a high repetition rate with a microdevice having a cell with a membrane separating the interior of the cell into first and second chambers, with at least a portion of the membrane movable in response to change in pressure in the chambers of the cell, and a charge of gas in the cell, including the steps of:

directly heating the gas in the first chamber to increase the gas pressure in the first chamber and move the membrane portion in a first direction by generating a transient gas pressure increase in the first chamber;

providing cooling of the gas for reducing the gas pressure in the first chamber;

directly heating the gas in the second chamber to increase the gas pressure in the second chamber and move the membrane portion in the opposite direction by generating a transient gas pressure increase in the second chamber; and providing cooling of the gas for reducing the gas pressure in the second chamber.

16. A method as defined in claim 15 including generating the transient gas pressure increases at cycle times of not more than about 50 microseconds.

17. A method as defined in claim 15 including generating the transient gas pressure increases at cycle times of not more than about 5 microseconds.

18. A method as defined in claim 15 including heating by directing photons from a photon source into the first chamber.

19. A method as defined in claim 15 including heating by connecting a pulsed electric power source to a thin film of resistance heating material on an inner surface of the cell.

20. A method as defined in claim 15 including heating by periodically producing an electrical discharge within said cell.

* * * * *